United States Patent
Goel et al.

(10) Patent No.: US 8,171,258 B2
(45) Date of Patent: May 1, 2012

(54) ADDRESS GENERATION UNIT WITH PSEUDO SUM TO ACCELERATE LOAD/STORE OPERATIONS

(75) Inventors: Rajat Goel, Saratoga, CA (US);
Chen-Ju Hsieh, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 540 days.

(21) Appl. No.: 12/506,311

(22) Filed: Jul. 21, 2009

(65) Prior Publication Data

US 2011/0022824 A1     Jan. 27, 2011

(51) Int. Cl.
*G06F 12/00* (2006.01)

(52) U.S. Cl. .................... 711/219; 365/230.06; 365/240; 711/3; 711/214

(58) Field of Classification Search ............. 365/230.06, 365/240; 711/3, 214, 219
See application file for complete search history.

(56) References Cited

U.S. PATENT DOCUMENTS

| | | | | |
|---|---|---|---|---|
| 4,791,555 A | * | 12/1988 | Garcia et al. ........................ 712/1 |
| 5,532,947 A | * | 7/1996 | Potter et al. .................... 708/200 |
| 5,878,424 A | * | 3/1999 | Dooling et al. ........................ 1/1 |
| 6,981,077 B2 | * | 12/2005 | Modelski et al. ............. 710/100 |
| 7,177,974 B2 | * | 2/2007 | Egner et al. .................... 711/101 |
| 2002/0166037 A1 | * | 11/2002 | Launiainen .................... 711/201 |
| 2006/0288151 A1 | * | 12/2006 | McKenney ....................... 711/3 |
| 2009/0013152 A1 | * | 1/2009 | Ehama et al. .................... 712/22 |

OTHER PUBLICATIONS

Lauterback, et al. "Low Load latency through Sum-Addressed Memory (SAM)" Proceedings of 25th Annual International Symposium of Computer Architecture 1999 pp. 369-379.

* cited by examiner

*Primary Examiner* — Jae Yu
(74) *Attorney, Agent, or Firm* — Lawrence J. Merkel; Meyertons, Hood, Kivlin, Kowert & Goetzel, P.C.

(57) ABSTRACT

In an embodiment, an address generation unit (AGU) is configured to generate a pseudo sum from an index portion of two or more operands. The pseudo sum may equal the index if the carry-in of the actual sum to the least significant bit of the index is a selected value (e.g. zero). The AGU may also include circuitry coupled to receive the operands and to generate the actual carry-in to the least significant bit of the index. The AGU may transmit the pseudo sum and the carry-in to a decode block for a memory array. The decode block may decode the pseudo sum into one or more one-hot vectors. The one-hot vectors may be input to muxes, and the one-hot vectors rotated by one position may be the other input. The actual carry-in may be the selection control of the mux.

19 Claims, 5 Drawing Sheets

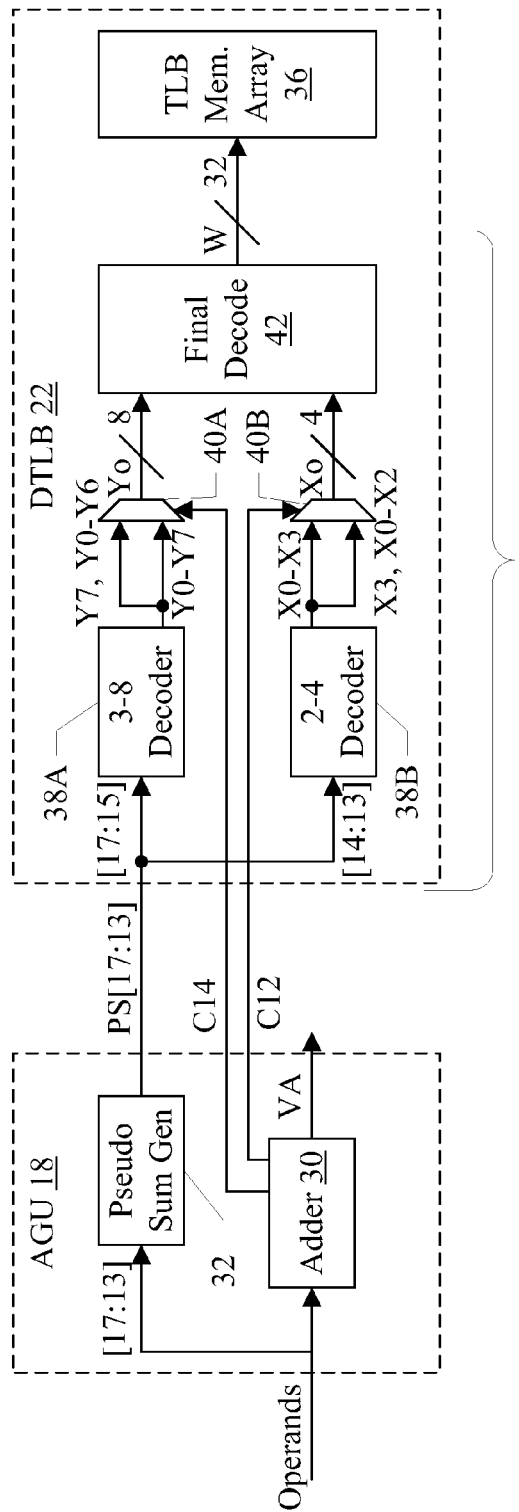
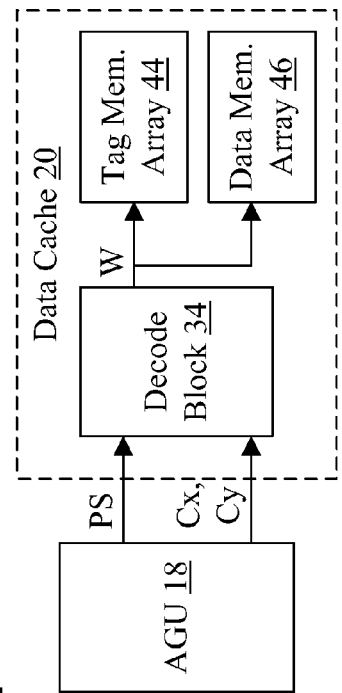
Fig. 3
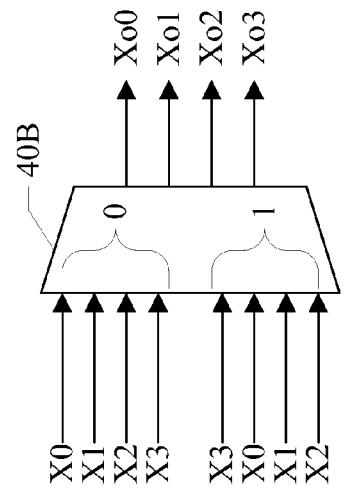
Fig. 4

ADDRESS GENERATION UNIT WITH PSEUDO SUM TO ACCELERATE LOAD/STORE OPERATIONS

BACKGROUND

1. Field of the Invention

This invention is related to the field of processors and, more particularly, to address generation for memory array access in processors.

2. Description of the Related Art

Processors generally include the ability to generate memory addresses, including fetch addresses from which instructions are read to be executed in the processor and data addresses from which operands are to be read. Typically, the address generation includes adding one or more values to produce the address. The addresses are large, such as 32 bits and up to 64 bits currently, and can increase in the future. Thus, the addition can take a fairly long time, especially when viewed in the context of a high frequency processor's short cycle time.

The time to generate the address is often particularly important when it is part of an access to a memory array within the processor, such as a cache, cache tag, or translation lookaside buffer. The timing path from receiving the operands, generating the address, decoding the address, and accessing the memory array is frequently one of the most critical timing paths in the processor.

SUMMARY

In an embodiment, an address generation unit (AGU) is configured to generate a sum from two or more operands, referred to as a "pseudo sum" herein. More particularly, the pseudo sum corresponds to an index to a memory array, and may equal the index if the carry-in of the actual sum to the least significant bit of the index is a selected value (e.g. zero). If the carry-in is not the selected value (e.g. it is one), the pseudo sum is incorrect by one (e.g. one too low). The AGU may generate the pseudo sum responsive to the index portions of the operands. The AGU may also include circuitry (e.g. an adder) coupled to receive the operands and to generate the actual carry-in to the least significant bit of the index. The AGU may transmit the pseudo sum and the carry-in to a decode block for a memory array. The decode block may decode the pseudo sum into at least one one-hot vector. The one-hot vector may be input to a mux, and the one-hot vector rotated by one position may be the other input. The actual carry-in may be the selection control of the mux.

In one embodiment, the decode block includes two decoders. Each decoder may decode a non-overlapping subset of the pseudo sum. One of the decoders decodes the subset including the least significant bit of the pseudo sum, and that decoder may output its vector to a mux selected by the actual carry-in. The AGU may supply another carry-in to least significant bits of the other subsets. These carry-ins may be the selection controls to the muxes corresponding to the other decoders. A final decode circuit may logically combine the selected vectors to generate the word lines to the memory array.

In some embodiments, the AGU and decode block may effectively hide the latency of the carry generation under the decoders. The overall delay of address generation and memory lookup may be reduced. In some cases, higher frequency operation may be supported using the AGU and decode block. In other cases, transistors having higher threshold voltages and lower power consumption may be used while still meeting timing goals. In still other cases, both higher frequency operation and lower power consumption may be achieved.

BRIEF DESCRIPTION OF THE DRAWINGS

The following detailed description makes reference to the accompanying drawings, which are now briefly described.

FIG. 2 is a block diagram of one embodiment of a portion of an address generation unit and a portion of a data translation lookaside buffer shown in FIG. 1

FIG. 3 is a block diagram of one embodiment of the address generation unit and a portion of a data cache shown in FIG. 1.

FIG. 4 is a block diagram of a multiplexor (mux) illustrating rotation of decoded input signals for one embodiment.

Figure 1:
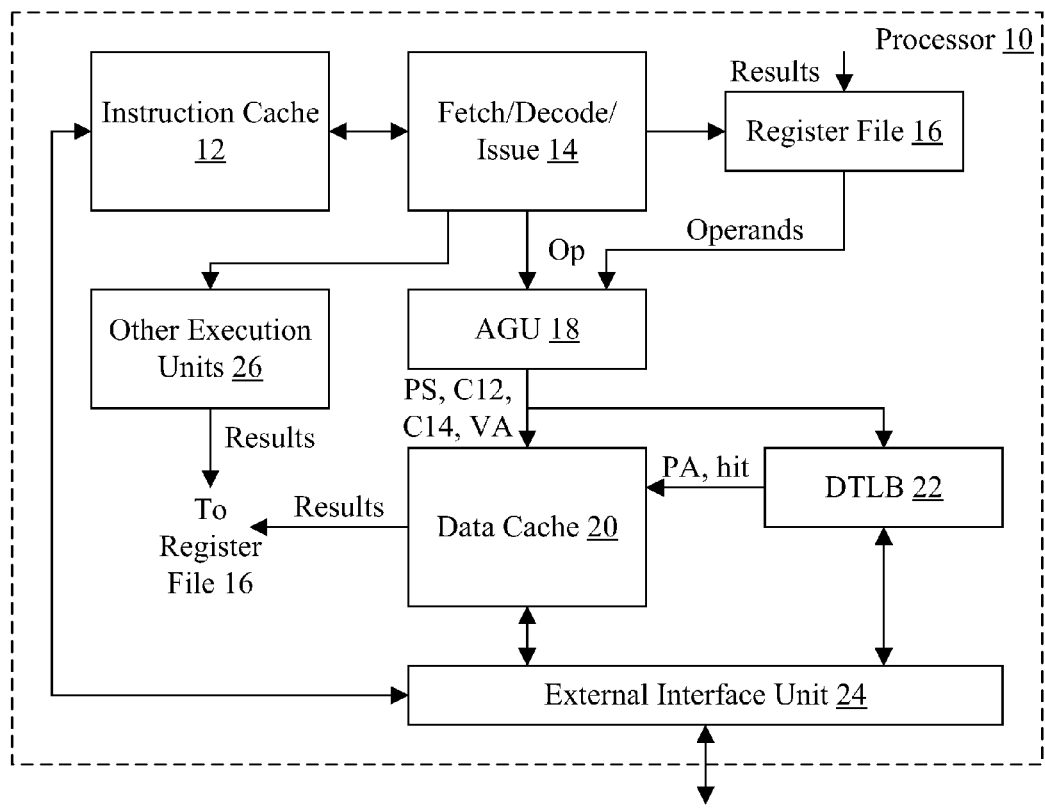
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a processor 10 is shown. In the illustrated embodiment, the processor 10 includes an instruction cache 12, a fetch/decode/issue unit 14, a register file 16, an address generation unit (AGU) 18, a data cache 20, a data translation lookaside buffer (DTLB) 22, an external interface unit 24, and one or more other execution units 26. The instruction cache 12 is coupled to the external interface 24 and to the fetch/decode/issue unit 14, which is further coupled to the register file 16, the AGU 18, and the other execution units 26. The register file 16 is coupled to the AGU 18 (and the other execution units 26, not shown in FIG. 1) to provide operands for execution and to the execution units 26 and the data cache 20 to receive results to be written. The AGU 18 is coupled to the data cache 20 and the DTLB 22, both of which are coupled to the external interface unit 24. The DTLB 22 is coupled to the data cache 20. The external interface unit 24 is further coupled to an external interface of the processor 10.

The fetch/decode/issue unit 12 may fetch instructions from the instruction cache 12, decode the instructions, and issue instruction operations for execution (when ready to execute, such as after any dependencies of the operations have been resolved). The fetch/decode/issue unit 12 may issue an instruction operation to the AGU 18 (if the operation is load or store memory operation) or the other execution units 26 (for other instruction operations). The fetch/decode/issue unit 14 may also transmit the register addresses of any register operands to the register file 16, which may forward the corresponding operands to the AGU 18/execution units 26.

The AGU 18 is coupled to receive the operands of a load/store operation (as well as the load/store operation itself, "op" in FIG. 1), and is configured to generate an address of the location accessed by the load/store operation responsive to the operands. More particularly, the AGU 18 may be configured to add the operands to produce the address. The address may be a virtual address ("VA" in FIG. 1) to be translated by the DTLB to a physical address ("PA" in FIG. 1). In some cases, translation may be disabled, in which case the virtual address is equal to the physical address.

The data cache 20 may include memory arrays (e.g. a tag memory array and a data memory array) that are indexed by a portion of the virtual address. That is, an entry in each memory is selected to be accessed responsive to an index portion of the address. Similarly, the DTLB 22 may include a memory array that is indexed by a portion of the virtual address. The index to the DTLB 22 need not be the same as the index to the data cache memory arrays. The index portion may generally exclude the least significant bits of the address (e.g. the cache offset bits that define the location of a byte within a cache block and/or page offset bits that define the location of a byte within a page). However, in order to generate the index bits of the VA, these least significant bits of the operands are added to determine a carry-in to the index addition and to locate the byte(s) to be accessed.

The AGU 18 may be configured to generate a pseudo sum (PS in FIG. 1) based on the index portion of the operands, and with an implicit carry-in to a least significant bit of the index portion. The implicit carry-in may have a predetermined state. For example, the implicit carry-in may be zero. Other embodiments may use an implicit carry-in of one. If the implicit carry-in is equal to the actual carry-in generated by adding the less significant bits of the operands (below the index portion of the operands), then the pseudo sum may be equal to the actual index. If the implicit carry-in is not equal to the actual carry-in, then the pseudo sum differs from the actual index by one. If the implicit carry-in is zero (and the actual carry-in is one), then the pseudo sum is one less than the actual index. If the implicit carry-in is one (and the actual carry-in is zero), then the pseudo sum is one greater than the actual index.

A decoder in the data cache 20 and the DTLB 22 decodes the index to generate word lines to the memory array, where each word line selects one location in the memory array. A given index causes the assertion of one word line, and the other word lines are deasserted. In this embodiment, the decoder may decode the pseudo sum, producing one or more vectors. If the actual carry-in is different from the implicit carry-in, these vectors may be rotated by one position to produce the set of vectors that correspond to the actual index. For example, if the implicit carry-in is zero (and thus the pseudo sum is one less than the actual index when the actual carry-in is one), the vectors may be rotated one position "down" (if the "top" entry of the memory array is entry 0, selected by index 0 and the "bottom" entry is entry N−1, selected by index N−1). That is, the vector bit corresponding to entry N−1 may be made the vector bit for entry 0; the vector bit for entry 0 may be made the vector bit for entry 1; etc. Rotating the vector down by one position may be the equivalent of incrementing the pseudo sum. Similarly, in the case that the implicit carry-in is one (and thus the pseudo sum is one more than the index when the actual carry-in is zero), the vectors may be rotated one position "up". That is, the vector bit corresponding to entry 0 may be made the vector bit for entry N−1; the vector bit for entry 1 may be made the vector bit for entry 0; etc. Rotating the vector up by one position may be the equivalent of decrementing the pseudo sum. For the remainder of this disclosure, an implicit carry-in of zero will be used as an example. However, embodiments having the implicit carry-in of one may also be implemented.

The pseudo sum may be generated more rapidly than the index portion of the virtual address, in some embodiments. The pseudo sum may be decoded while the actual carry-in is computed, which may hide the latency of the carry-in generation. Overall latency to access the DTLB 22 and data cache 20 may be reduced, in some embodiments.

In one embodiment, the pseudo sum is divided into two or more subfields, each of which is decoded independently and in parallel in the decoder. The resulting vectors may be logically combined to generate the word lines to the memory array (e.g. logically ANDing each bit of one vector with each bit of the other vector). In such embodiments, the AGU 18 may be configured to generate the carry-in to the least significant bit of each subfield. In one embodiment used as an example below, the index is bits [17:13] of the address and the index is divided into two fields ([17:15] and [14:13]). For such embodiments, the carry-out of bits 14 and 12 (C14 and C12 in FIG. 1), respectively, may be the carry-ins (to bit 15 and bit 13, respectively). The AGU may generate the actual carry-outs of bits 14 and 12, which are the actual carry-ins to bits 15 and 13, to determine if the vectors from one or both of the decoders is to be rotated.

Any subset of address bits may be used as an index to one of the memory arrays. As mentioned previously, the indexes to different memory arrays may have different indexes. In such cases, multiple pseudo sums may be generated for different memory arrays.

The instruction cache 12 may be a cache memory for storing instructions to be executed by the processor 10. The instruction cache 12 may have any capacity and construction (e.g. direct mapped, set associative, fully associative, etc.). The instruction cache 12 may have any cache block size. For example, 64 byte cache blocks may be implemented in one embodiment. Other embodiments may use larger or smaller cache line sizes. In response to a given PC from the fetch/decode/issue unit 14, the instruction cache 12 may output up to a maximum number of instructions. In response to a cache miss, the instruction cache 12 may fetch the missing cache block from memory via the external interface unit 24.

The fetch/decode/issue unit 14 may include any circuitry used to generate PCs for fetching instructions. The fetch/decode/issue unit 14 may include, for example, branch prediction hardware used to predict branch instructions and to fetch down the predicted path. The fetch/decode/issue unit 14 may also be redirected (e.g. via misprediction, exception, interrupt, flush, etc.). The fetch/decode/issue unit 14 may generally be configured to decode the fetched instructions into instruction operations (ops). Generally, an instruction operation may be an operation that the hardware included in the execution units 26/AGU 18 is capable of executing. Each instruction may translate to one or more instruction operations which, when executed, result in the performance of the operations defined for that instruction according to the instruction set architecture. In various embodiments, the processor 10 may implement any instruction set architecture. In some embodiments, each instruction may decode into a single instruction operation. The fetch/decode/issue unit 14 may identify the type of instruction, source operands, etc., and the decoded instruction operation may comprise the instruction along with some of the decode information. In other embodiments in which each instruction translates to a single op, each op may simply be the corresponding instruction or a portion thereof (e.g. the opcode field or fields of the instruction). In other embodiments, some instructions may decode into multiple instruction operations. In some embodiments, fetch/decode/issue unit 14 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode. The generated ops may include load/store memory ops. Load memory ops (or more briefly "load ops" or "loads") may read data from memory into a register in the register file 16 (although the load may be completed in the data cache 20). Store memory ops (or more briefly "store ops" or "stores") may write data a register in the register file 16 to memory (although the store may be completed in the data cache 20). The generated ops may also include various arithmetic/logic ops (integer, floating point, multimedia, etc.), branch ops, etc.

The fetch/decode/issue unit 14 may implement register renaming to map source register addresses from the ops to the source operand numbers identifying the renamed source registers. Additionally, the fetch/decode/issue unit 14 may determine dependencies for each op on previous ops. The dependencies may be recorded in any desired fashion.

The fetch/decode/issue unit 14 may monitor the execution of ops and evaluate which ops that are awaiting execution are eligible for scheduling. The fetch/decode/issue unit 14 may schedule the eligible ops, and may read each op's source operands from the register file 16. The source operands may be provided to the AGU 18 (for load/store ops) or the other execution units 26 (for other ops). The execution units 26 and the data cache 20 (for load ops) may return the results of ops that update registers to the register file 16. In some embodiments, the fetch/decode/issue unit 14 may implement a centralized scheduler storing ops for execution, from which eligible ops are read when scheduled. In other embodiments, a decentralized scheduling scheme such as reservation stations may be used.

The AGU 18 may receive the load/store op's operands and generate the address, as noted above. The DTLB may translate the virtual address to a physical address and may provide the physical address (and a hit signal indicating that the address is available) to the data cache 20. The DTLB 22 may include a TLB for storing recently used translations, and may also include table walk hardware to read a missing translation when a TLB miss is detected. The table walk hardware may communicate with the external interface unit 24 to read the translations. The data cache 20 may receive the virtual and physical addresses, and may read or write data in the cache if there is a hit for the address. If the address misses, the data cache 20 may read the missing cache block from memory (via the external interface unit 24).

The processor 10 may also include a load/store unit (not shown in FIG. 1). The load/store unit may handle any ordering issues between loads and stores, queue stores awaiting commit to the data cache 20 and loads awaiting fills, etc.

The other execution units 26 may generally include additional execution hardware to execute, e.g., integer ops, floating point ops, multimedia ops, branch ops, etc. Any set of execution units may be provided, in various embodiments.

The register file 16 may generally comprise any set of registers usable to store operands and results of ops executed in the processor 10. In some embodiments, the register file 16 may comprise a set of physical registers and the fetch/decode/issue unit 14 may map the logical registers to the physical registers. The logical registers may include both architected registers specified by the instruction set architecture implemented by the processor 10 and temporary registers that may be used as destinations of ops for temporary results (and sources of subsequent ops as well). In other embodiments, the register file 16 may comprise an architected register set containing the committed state of the logical registers and a speculative register set containing speculative register state.

The interface unit 24 may generally include the circuitry for interfacing the processor 10 to other devices on the external interface. The external interface may comprise any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components.

Turning now to FIG. 2, a block diagram illustrating additional details of a portion of one embodiment of the AGU 18 and the DTLB 22. In the illustrated embodiment, the AGU 18 includes an adder 30 coupled to receive the operands of the load/store op and configured to generate the virtual address (VA) and, in this embodiment, the carry-out of bits 12 and 14 of the VA (C12 and C14, respectively). C 12 is the carry-in to bit 13 of the addition and C14 is the carry-in to bit 15 of the addition. Bit 0 is the least significant bit in the notation of FIG. 2 and other bit notations used herein. The AGU 18 further includes a pseudo sum generator 32 coupled to receive bits 17:13 of the operands and configured to generate the pseudo sum for the same bits (PS[17:13]). The DTLB 22 includes a decode block 34 coupled to receive the pseudo sum and the carry bits C12 and C14 and is provide word lines to a TLB memory array 36. More particularly, in the illustrated embodiment, the decode block 34 includes decoders 38A-38B, muxes 40A-40B, and final decode circuit 42. The decoders 38A-38B are coupled to receive bits 17:15 and bits 14:13 of the pseudo sum, respectively, and are configured to decode the received bits into output vectors Y0 to Y7 and X0 to X3, respectively. The output vectors are input to the muxes 40A-40B, and are supplied to another input of the muxes 40A-40B rotated by one position. The muxes 40A-40B are coupled to receive the carry bits C14 and C12, respectively, on their selection inputs and are configured to output vectors Yo and Xo, respectively. The final decode circuit 42 is coupled to received the Yo and Xo vectors, and is configured to generate the word lines (W) to the TLB memory array 36.

In this example, the index portion of the address is bits 17:13. Other embodiments may use different subsets of the address as the index, and/or larger or smaller indexes. Accordingly, in this embodiment, the carry-in to bit 13 is used to determine if the pseudo sum is correct or off by one. In the illustrated embodiment, the decode block divides the pseudo sum into subfields, and so the carry-in to the other subfield (bit 15) is also supplied.

The adder 30 may receive the full operands, and may be configured to add the operands to produce the virtual address (VA). The adder 30 may have any implementation that produces the sum of the operand values. That is, the adder 30 may implement a full add operation. Additionally, in this embodiment, the adder 30 may output the carry-outs from bits 12 and 14. In other embodiments, a separate circuit may be provided to generate the desired carry-out bits (carry-in bits to the next more significant bit in the addition).

The pseudo sum generator 32 may be configured to generate the pseudo sum responsive to bits 17:13 of the operands. Thus, the output of the pseudo sum generator 32 is illustrated as bits 17:13 to match the index field of the address. However, the pseudo sum generator 32 may be configured to generate only the index portion (e.g. there is no pseudo sum bits 12:0 or bits N−1:18, wherein N is the number of bits in the VA). In this embodiment, the pseudo sum generator 32 may be implemented with the implicit carry-in to bit 13 of zero. Thus, if the actual carry-in to bit 13 is a one, the pseudo sum will be one less than the actual index in the VA. Other embodiments may include a pseudo sum generator that is implemented with the implicit carry-in of one, as mentioned previously.

The decoder 38A is configured to decode bits 17:15 of the pseudo sum, producing the output vector (or decoded signals) Y0 to Y7. The vector Y0-Y7 is one-hot, meaning that one and only one of the signals Y0 to Y7 is a one, and other signals are zero. Each signal in the vector corresponds to a different possible value of bits 17:15. For example, Y0 may be a one if all three bits are zero; Y1 may be a one if bits 17:16 are zero and bit 15 is a one; etc. to Y7 may be a one if all three bits are one. Accordingly, if the pseudo sum is one less than the actual index, the correct one-hot vector may be generated by shifting the bits down one (Y0 becomes Y1, which is the same as adding one to all three bits being zero, etc. down to Y7 becomes Y0, which is the same as adding one to all three bits being a one).

The rotation if the C14 is a one (or no rotation if C14 is a zero) may be accomplished by the mux 40A. The unrotated vector may be coupled to the "0" input of the mux 40A (e.g. the input that is selected if the selection control is zero), and the rotated vector may be coupled to the "1" input of the mux 40A (e.g. the input that is selected if the selection control is one). In FIG. 2, the "0" input is on the bottom of the mux 40A and the unrotated vector Y0-Y7 is coupled thereto. The "1" input is on the top of the mux 40A and the rotated vector Y7, Y0-Y6 is coupled thereto (with Y7 in the Y0 position, Y0 in the Y1 position, etc.). The mux 40B in FIG. 2 has the "0" input on the top and the "1" input on the bottom.

The decoder 38B similarly decodes bits 14:13 into a four bit one-hot vector X0-X3, which is coupled to the mux 40B in a similar fashion to that described above for the decoder 38A and the mux 40A. The mux control for the mux 40B is C 12. The outputs of the muxes 40A-40B are coupled to the final decode circuit 42. The final decode circuit 42 may logically AND each bit of the Yo vector with each bit of the Xo vector to produce the 32 word lines W to the TLB memory array 36. For example, Yo bit 0 (Yo0) may be ANDed with each Xo bit to produce word lines W0 to W3; Yo bit 1 (Yo1) may be ANDed with each Xo bit to produce word lines W4 to W7; etc. Each word line may select a separate entry in the TLB memory array 36.

The muxes 40A-40B may be examples of selection circuits. Generally, a selection circuit may comprise any circuitry that is coupled to receive two or more inputs (where each input may be one or more bits) and is configured to select one of the inputs as an output responsive to a selection control.

It is noted that, while the decode block 34 of FIG. 2 divides the input pseudo sum into two subfields to decode, and then logically combines the decoded vectors in a final decode stage to generate the word lines, other embodiments may not divide the pseudo sums into subfields. Instead, the pseudo sum may be decoded in a single decoder (and may be rotated or not based on the actual-carry to the least significant bit of the pseudo sum in a selection circuit coupled to the output of the decoder). Still other embodiments may use more than two subfields.

Turning now to FIG. 3, a block diagram of the AGU 18 and the data cache 20 are illustrated with the pseudo sum and carry-ins Cx and Cy are provided to the decode block 34, which provides the word lines to a data cache tag memory array 44 and a data cache data memory array 46 is shown. The carry-ins are denoted Cx and Cy to indicate that the index to the data cache 20 need not be the same as the index to the DTLB 22. That is, the AGU 18 may include a second pseudo sum generator to generate the pseudo sum for the data cache 20. Alternatively, the same index may be used and Cx and Cy may be C12 and C14.

FIG. 4 is a block diagram illustrating the mux 40B, illustrating the rotation of the one-hot decoded signals via connections to the mux 40B. The "0" input is shown at the top of the mux 40B, and the "1" input is shown at the bottom. Accordingly, the one-hot vector X0 to X3 is connected in order to the "0" input (X0 to X3). On the "1" input, X3 is connected at the position of X0, and each other input is connected one position lower. The output of the mux 40B, Xo0 to Xo3, is shown as well. Thus, if the select control to the mux 40B is 0, Xo0 is X0 (top signal of the 0 input) and if the select control to the mux 40B is 1, Xo0 is X3 (top signal of the 1 input). Similarly, if the select control to the mux 40B is 0, Xo1 is X1; Xo2 is X2; and Xo3 is X3. If the select control to the mux 40B is 1, Xo1 is X0; Xo2 is X1; and Xo3 is X2.

Figure 5:
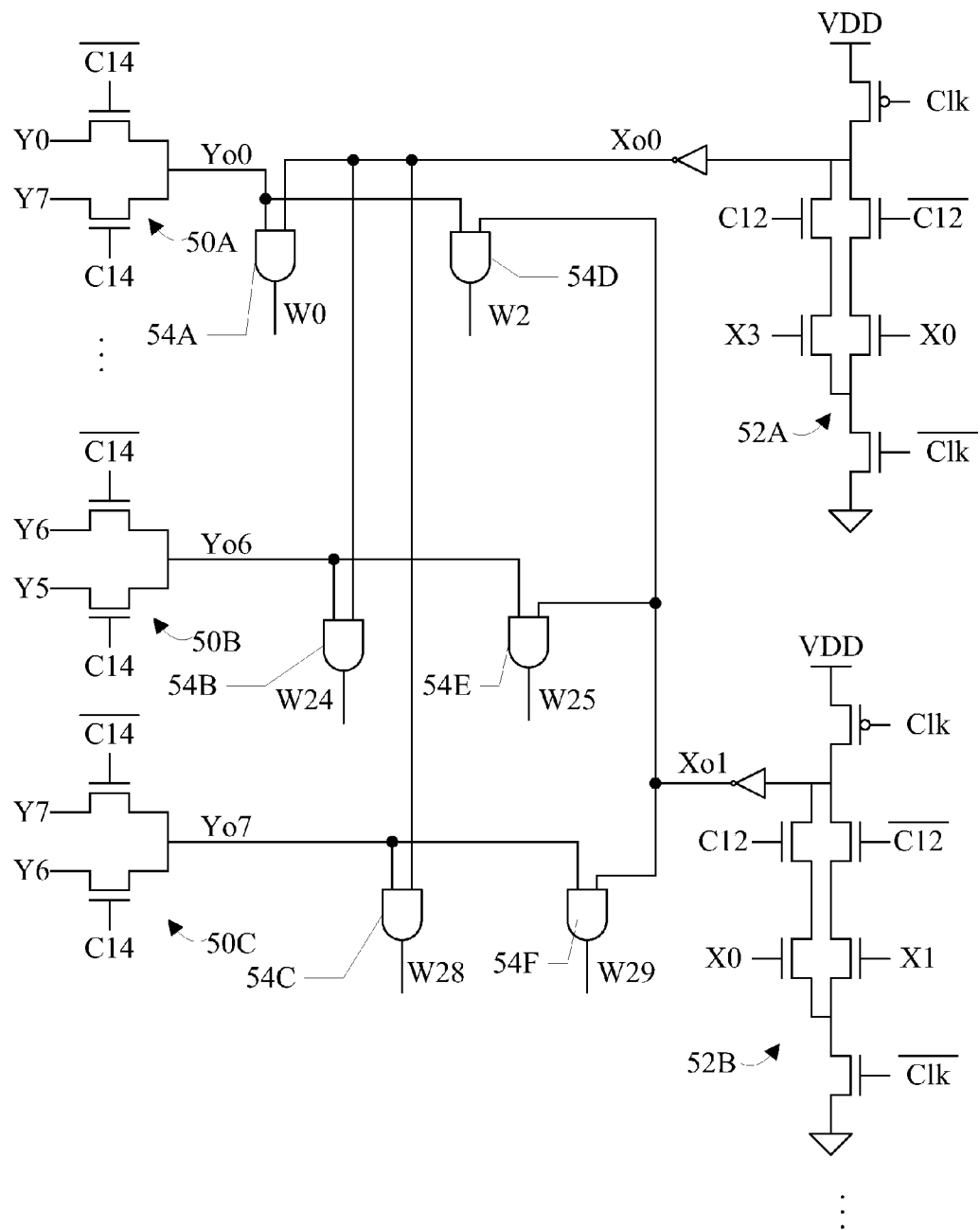
FIG. 5 is a circuit diagram illustrating one embodiment of circuitry illustrated in block diagram form in FIG. 2.

Turning next to FIG. 5, a circuit diagram of one embodiment of a portion of the muxes 40A and 40B and the final decode circuit 42 is shown. Numerous other circuit implementations are possible.

In the illustrated embodiment, the mux 40A is implemented as a set of passgates coupled to receive the various decoded signals and to output one of the output signals. For example, the passgate 50A is coupled to receive the Y0 and Y7 signals, and to output the Yo0 signal. If the C14 signal is asserted, the passgate 50A may pass the signal Y7 on to Yo0. If the C14 signal is deasserted (and thus the inverse of C14, C14 with a bar over it in FIG. 5, is asserted), the passgate 50A may pass the Y0 signal to Yo0. The passgate 50B is coupled to receive the Y6 and Y5 signals, and to output Yo6; and the passgate 50B is coupled to receive the Y7 and Y6 signals, and to output Yo7. Other passgates, not shown in FIG. 5, may output Yo1 through Yo5.

The mux 40B in the embodiment of FIG. 5 may be implemented as clocked dynamic muxes such as circuits 52A-52B corresponding to outputs Xo0 and Xo1, respectively. When the clock is low, the P-type metal-oxide-semiconductor (PMOS) device in the circuits 52A-52B precharges the dynamic nodes high (outputs Xo low), and when the clock is low, the series connection of the transistors that have gates coupled to receive the carry bit (C12 and C12 bar, respectively) with the transistors that have gates coupled to input bits (e.g. X3 and X0 for output Xo0) selectively discharge the dynamic node (charge the output Xo). Thus, for example, the mux 52A may drive Xo0 high when the clock is high if either C12 is asserted and X3 is asserted or C12 bar is asserted and X0 is asserted. Otherwise, Xo0 may remain low.

The mux 40B may be a clocked mux in this embodiment to aid in the timing of the assertion of the word lines. Other embodiments may implement the timing control elsewhere, and the mux 40B may have any other embodiment (e.g. passgates, similar to the mux 40A, or any other selection circuit embodiment).

The AND gates 54A-54F as illustrated in FIG. 5 may be part of the final decode circuit 42. For example, the AND gate 54A receives Yo0 and Xo0, and thus generates the word line W0 in this embodiment. The AND gate 54D receives Yo0 and Xo1, and thus generates the word line W. Similar AND gates may receive Yo0 and Xo2/Xo3, generating word lines W2/W3. Similarly, AND gates 54B and 54E receive Yo6 and Xo0/Xo1, generating words lines W24 and W25; and AND gates 54B and 54E receive Yo7 and Xo0/Xo1, generating word lines W28 and W29. While AND gates are shown in FIG. 5, any logic gates which logically combine the outputs of decoders to produce the word lines W0 to W31 may be used, including Boolean equivalents of the circuitry shown in FIG. 5.

Figure 6:
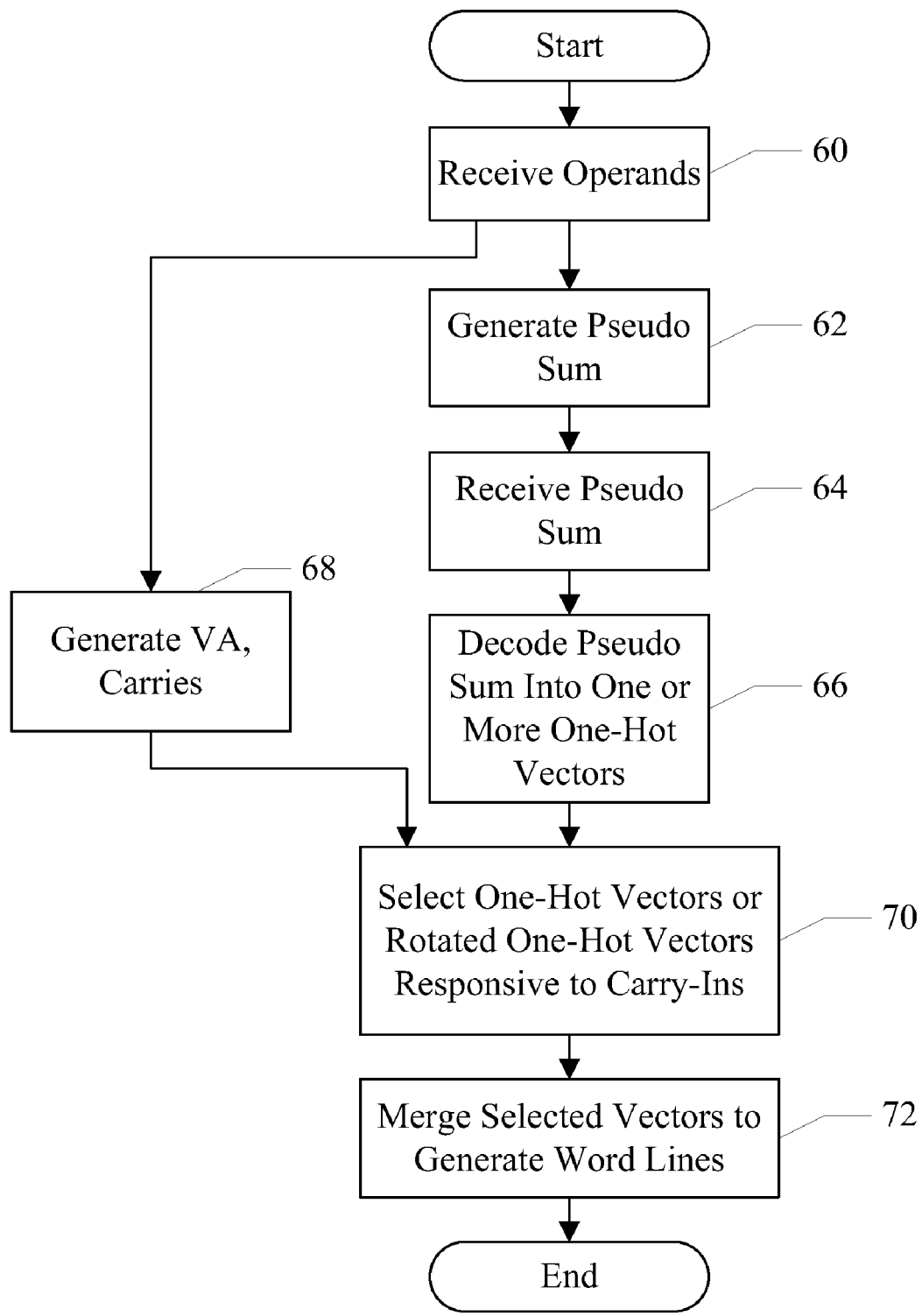
FIG. 6 is a flowchart illustrating operation of one embodiment of the address generation unit and the decode block shown in FIG. 2.

Turning to FIG. 6, a flowchart is shown illustrating operation of one embodiment of the AGU 18 and the decode block 34. While the blocks are shown in a particular order for ease of understanding, other orders may be used. Blocks may be performed in parallel in combinatorial logic in the AGU 18 and/or the decode block 34. The AGU 18 and/or the decode block 34 may be configured to implement the operation shown.

The AGU 18 may receive two or more operands of the load/store ops (block 60), and may generate the pseudo sum from the index portion of the operands (block 62). The AGU 18 may transmit the pseudo sum to the decode block 34. The decode block 34 may receive the pseudo sum (block 64), and may decode the pseudo sum into one or more one-hot vectors (block 66). Responsive to the operands, the AGU 18 may also generate the virtual address, and may transmit one or more carries to the decode block 34 to correct if the pseudo sum is inaccurate (block 68). The virtual address and carries may be available later in time than the pseudo sum. In response to the respective carries, the decode block 34 may select the one-hot vectors or the one-hot vectors rotated by one position (block 70). The decode block 34 may merge the selected vectors to generate the word lines (block 72).

Figure 7:
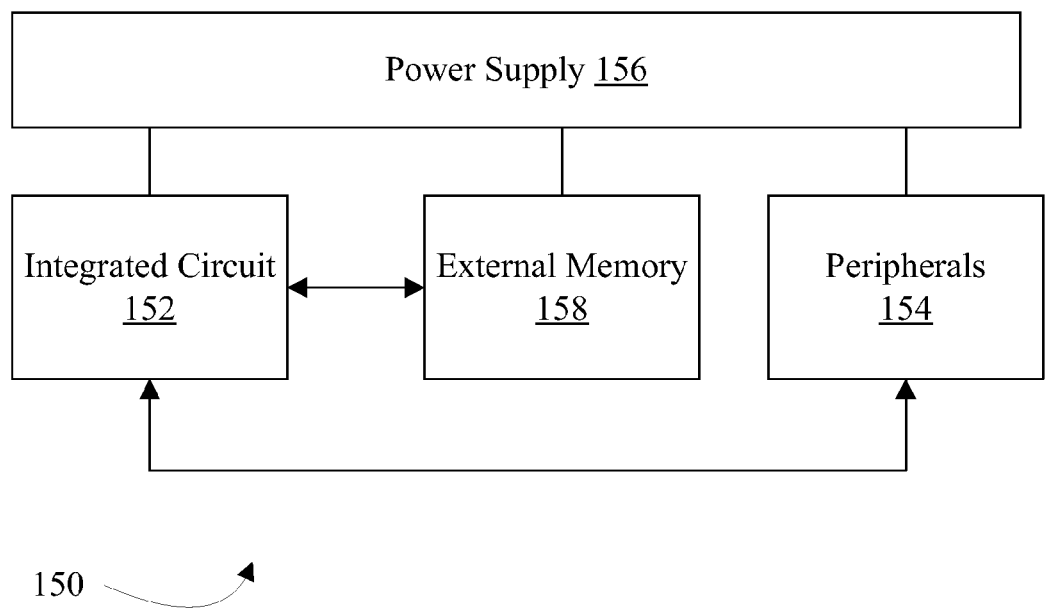
FIG. 7 is a block diagram of one embodiment of a system.

Turning next to FIG. 7, a block diagram of one embodiment of a system 150 is shown. In the illustrated embodiment, the system 150 includes at least one instance of an integrated circuit 152 coupled to one or more peripherals 154 and an external memory 158. The integrated circuit 152 may include one or more instances of the processor 10, in one embodiment. The integrated circuit 152 may also include additional components, such as additional caches, a memory controller, etc. in some embodiments. A power supply 156 is also provided which supplies the supply voltages to the integrated circuit 152 as well as one or more supply voltages to the memory 158 and/or the peripherals 154. In some embodiments, more than one instance of the integrated circuit 152 may be included (and more than one external memory 158 may be included as well).

The external memory 158 may include any type of memory. For example, the memory may comprise dynamic random access memory (DRAM), synchronous DRAM (SDRAM), double data rate (DDR, DDR2, DDR3, etc.) SDRAM (including mobile versions of the SDRAMs such as mDDR3), RAMBUS DRAM (RDRAM), static RAM (SRAM), etc.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:

1. A processor comprising:
an address generation unit coupled to receive operands of a memory operation and configured to generate a first sum corresponding to an index into a memory array, the address generation unit generating the first sum from bits of the operands that are in bit positions that correspond to the index and excluding other bits of the operands, and using an implicit carry-in to the least significant bit of the index of zero, and wherein the address generation unit is further configured to generate an actual carry-in;
a decode block coupled to receive the first sum and the actual carry-in from the address generation unit, wherein the decode block is configured to generate a set of word lines for the memory array responsive to the first sum and the carry-in, wherein the decode block is configured to decode the first sum to generate an initial set of decoded signals, and wherein the decode block is further configured to select between the initial set and a second set of decoded signals comprising the initial set rotated by one position responsive to the actual carry-in.

2. The processor as recited in claim 1 wherein the decode block is configured to generate at least two initial sets of decoded signals responsive to subfields of the first sum, and wherein the address generation unit is further configured to generate one or more additional actual carry-ins to the least significant bit of the each subfield other than a least significant subfield.

3. The processor as recited in claim 1 further comprising a data cache that uses the decode block, wherein the index is the index to a data cache tag memory, and wherein the data cache tag memory is coupled to receive the word lines from the decode block.

4. The processor as recited in claim 3 wherein the index is also the index to a data cache data memory.

5. The processor as recited in claim 1 further comprising a translation lookaside buffer that includes the decode block, wherein the index is an index to the translation lookaside buffer memory.

6. An address generation unit comprising:
a partial sum generator coupled to receive a subset of operand bits from two or more operands provided to the address generation unit, wherein the partial sum generator is configured to generate an index from the subsets of the operands, the index generated by the partial sum generator being equal to an index field of the address if the carry-in to the least significant bit of the index field is a predetermined value; and a second circuit coupled to receive the operands and configured to generate an actual carry-in to the least significant bit.

7. The address generation unit as recited in claim 6 wherein the second circuit is an adder that adds the operands to generate an address that includes the index field.

8. The address generation unit as recited in claim 6 wherein the second circuit is separate from an adder that adds the operands to generate an address that includes the index field.

9. The address generation unit as recited in claim 6 wherein the second circuit is further configured to generate a second carry-in to a bit within the index.

10. A decode block comprising:

a decoder coupled to receive a pseudo sum corresponding to an address, wherein the decoder is configured to decode the pseudo sum into a set of decoded signals corresponding to the pseudo sum; and a selection circuit coupled to receive the set of decoded signals and configured to select either the set of decoded signals or a second set of decoded signals which are equal to the set of decoded signals rotated by one position, wherein the selection is responsive to a carry-in to a least significant bit of an actual sum that corresponds to the pseudo sum.

11. The decode block as recited in claim 10 further comprising:

a second decoder coupled to receive a second pseudo sum corresponding to the address, wherein the second decoder is configured to decode the second pseudo sum into a third set of decoded signals corresponding to the second pseudo sum; and a second selection circuit coupled to receive the third set of decoded signals and configured to select either the third set of decoded signals or a fourth set of decoded signals which are equal to the decoded signals rotated by one position, wherein the selection is responsive to a second carry-in to a least significant bit of the actual sum that corresponds to the second pseudo sum.

12. The decode block as recited in claim 11 wherein the second pseudo sum includes a least significant bit that is adjacent, in the address, to a most significant bit of the pseudo sum.

13. The decode block as recited in claim 11 further comprising a final decode circuit configured to logically combine an output of the selection circuit and the second selection circuit to generate a set of word lines for a memory array.

14. A method comprising:

receiving a pseudo sum in a decoder, the pseudo sum corresponding to an index portion of an address; decoding the pseudo sum, producing one or more one-hot vectors; receiving a carry-in to a least significant bit of the index portion; selecting the one-hot vector rotated by one bit position in response to the carry-in being a logical one; and generating the carry-in responsive to a plurality of less significant bits of two or more operands, the plurality of less significant bits being less significant than bits in the index portion.

15. The method as recited in claim 14 further comprising:
receiving a second pseudo sum in a decoder;
decoding the second pseudo sum, producing one or more second one-hot vectors;
receiving a second carry-in to a least significant bit of the index portion; and
selecting the second one-hot vector unrotated in response to the carry-in being a logical zero.

16. The method as recited in claim 14 further comprising:
receiving at least one second carry-in to a first bit within the index, wherein the first bit is not the least significant bit of the index; and
generating a second one-hot vector using bits beginning at the first bit.

17. The method as recited in claim 16 further comprising selecting the second on-hot vector rotated by one bit position responsive to the carry-in being a logical one.

18. The method as recited in claim 14 further comprising:
receiving two or more operands; and
generating the pseudo sum responsive to the index portions of the two or more operands.

19. An apparatus comprising:

a sum generator coupled to receive an index portion of two or more operands used to form an address, wherein the sum generator is configured to generate a first sum responsive to the index portions of the two or more operands, wherein the first sum is equal to the index portion of the address if the carry-in of an addition of the two or more operands to a least significant index bit is zero;

an adder configured to generate the carry-in to the least significant bit and a second carry-in to a second bit of the index portion that is not the least significant bit;

a first decoder configured to decode a first subset of the first sum beginning with the least significant bit and ending at a third bit that is the next less significant bit to the second bit, the first decoder producing a first vector;

a second decoder configured to decode a second subset of the first sum beginning with the second bit and including remaining bits of the index portion that are not in the first subset, the second decoder producing a second vector;

a first selection circuit coupled to receive the first vector as a first input and the first vector rotated by one as a second input, wherein the first selection circuit is coupled to receive the carry-in as a selection input and is configured to output a first selected vector responsive to the carry-in;

a second selection circuit coupled to receive the second vector as a first input and the second vector rotated by one as a second input, wherein the first selection circuit is coupled to receive the second carry-in as a selection input and is configured to output a second selected vector responsive to the second carry-in; and a final decode circuit coupled to receive the first selected vector and the second selected vector and configured to generate a plurality of word lines for a memory array by logically combining the first selected vector and the second selected vector.

* * * * *